United States Patent [19]

Tabata et al.

[11] Patent Number: 5,737,012
[45] Date of Patent: Apr. 7, 1998

[54] HEAD MOUNTED IMAGE DISPLAY APPARATUS AND IMAGE FORMING APPARATUS RELATED THERETO

[75] Inventors: Seiichiro Tabata, Hino; Yoichi Iba, Hachioji, both of Japan

[73] Assignee: Olympus Optical Co., Ltd., Tokyo, Japan

[21] Appl. No.: 564,711

[22] Filed: Nov. 29, 1995

[30] Foreign Application Priority Data

Dec. 1, 1994 [JP] Japan ................................. 6-298178

[51] Int. Cl.$^6$ ................................................. H04N 13/04
[52] U.S. Cl. ........................... 348/53; 348/43; 345/8
[58] Field of Search ........................ 348/53, 43; 345/8; 353/7; 359/462, 466; H04N 13/04

[56] References Cited

U.S. PATENT DOCUMENTS 5,642,221  6/1997  Fischer ................................. 348/53

FOREIGN PATENT DOCUMENTS 5-241095A  9/1993  Japan .

Primary Examiner—Howard W. Britton
Attorney, Agent, or Firm—Watson Cole Stevens Davis, P.L.L.C.

[57] ABSTRACT

A head mounted image display apparatus capable of performing a stereoscopical viewing, having first and second image display sections and displaying first and second images each having parallax on these first and second image display sections is disclosed. The apparatus comprises a position of convergence deciding means for deciding diopter adjusting signals corresponding to parallax or convergence angle of the line of sight position of a viewer by detecting the line of sight direction of at least one eye of the both right and left eyes to decide the line of sight position of the viewer in a viewing region; a diopter adjusting mechanism adapted to receive the diopter adjusting signal for adjusting the diopter of the first and second image display sections; and the line of sight position deciding means including a diopter adjusting signal selecting means for selecting the diopter adjusting signal out of a plurality of diopter adjusting signals or the signals corresponding thereto, based on the position of convergence.

25 Claims, 16 Drawing Sheets

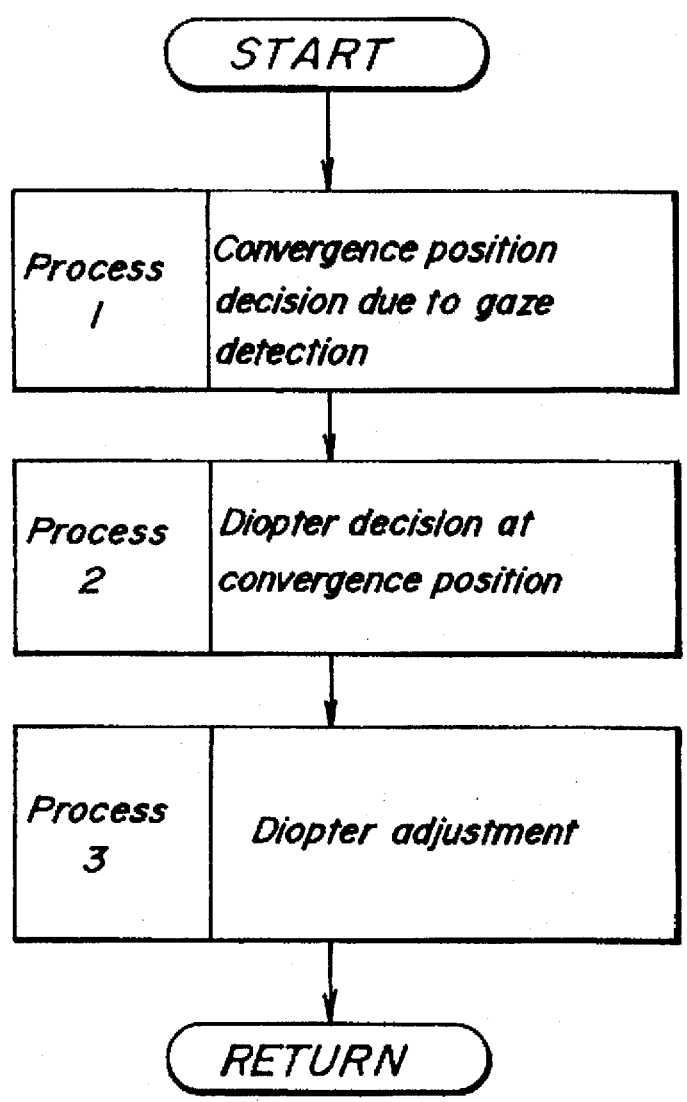
FIG_2

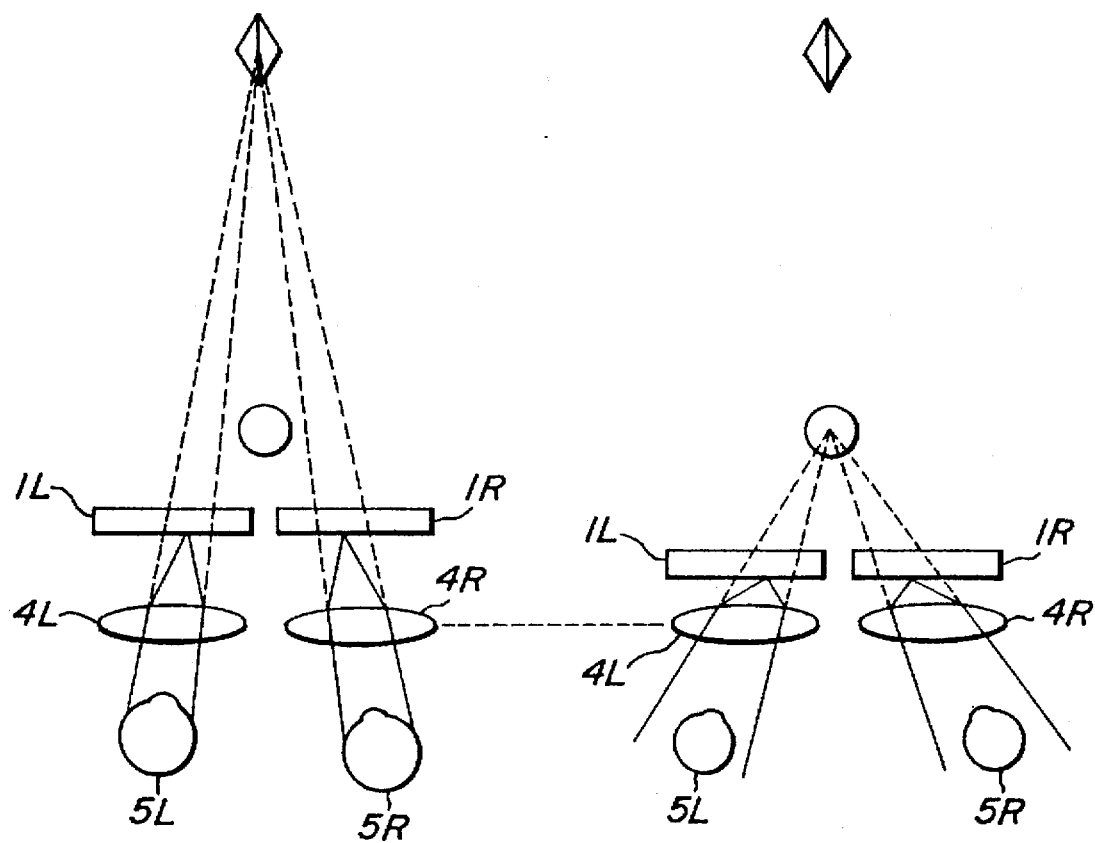

FIG_4
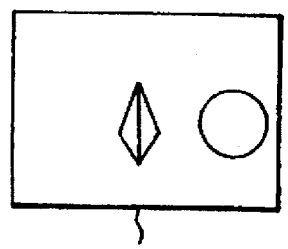
Displayed image in IL
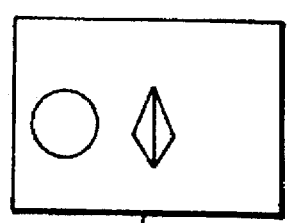
Displayed image in IR
FIG_5a
| Left | Center | Right |
|------|--------|-------|
FIG_5b
| Left upper | Upper | Right upper |
|------------|--------|-------------|
| Left | Center | Right |
| Left lower | Lower | Right lower |

FIG_10

FIG._11

FIG_15

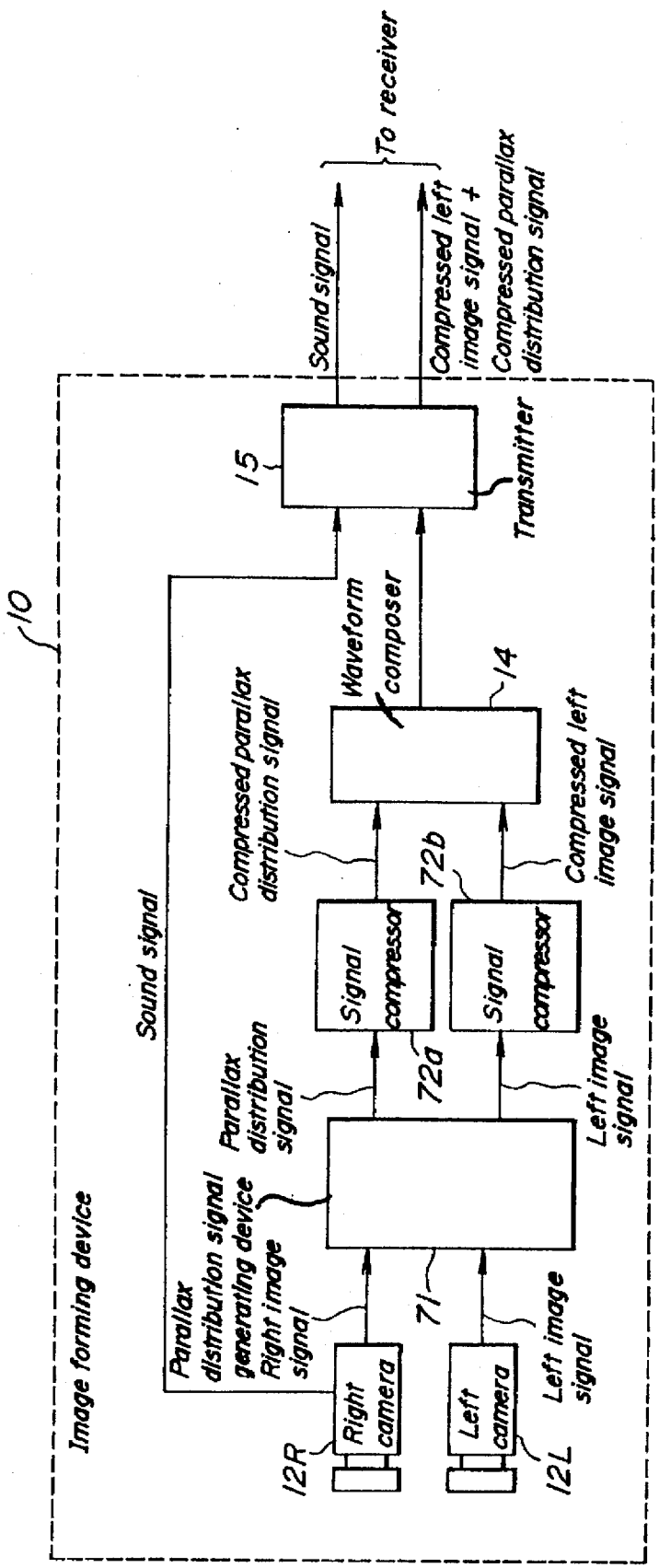

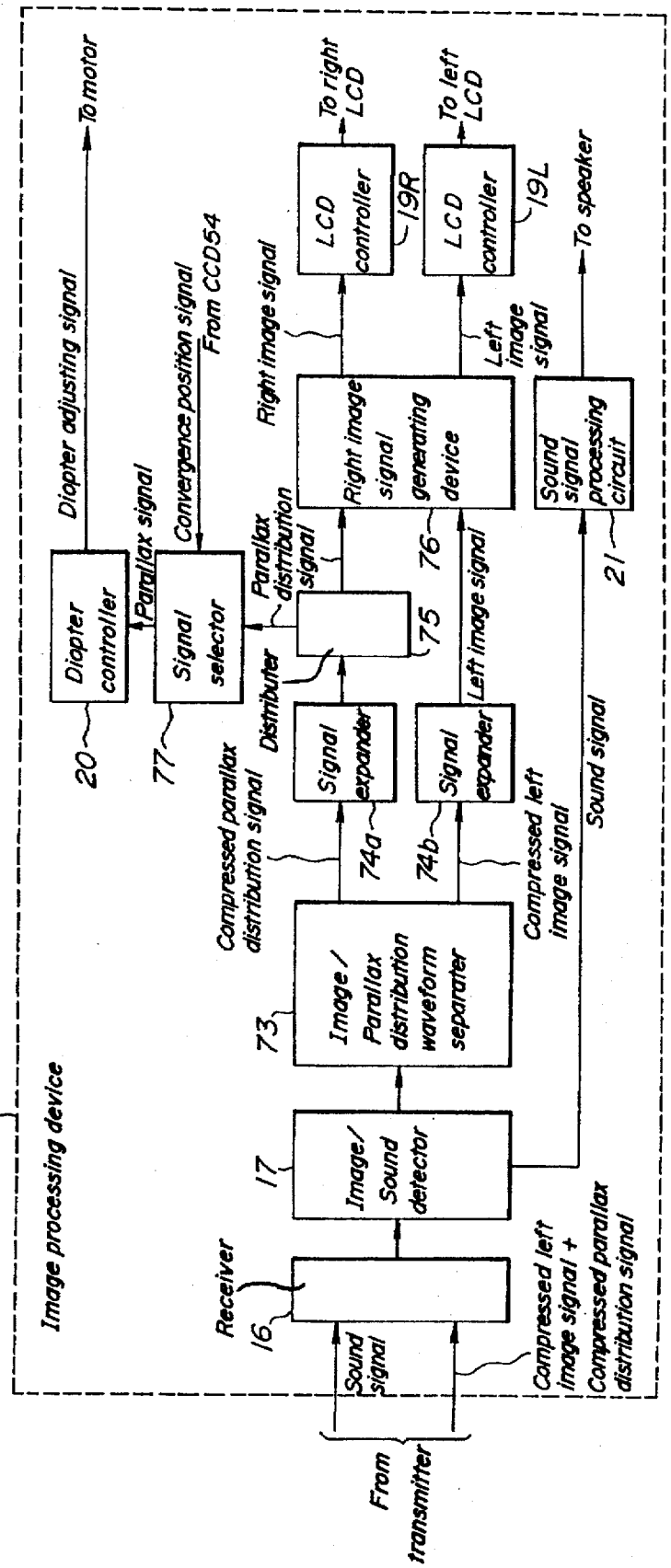
FIG_17b

HEAD MOUNTED IMAGE DISPLAY APPARATUS AND IMAGE FORMING APPARATUS RELATED THERETO

BACKGROUND OF THE INVENTION

1. Field of the Invention

The present invention relates to a head mounted image display apparatus capable of viewing a stereoscopic image by leading different images to right and left eyes of a viewer, and an image forming apparatus related thereto.

2. Related Art Statement

A conventional example of a head mounted image display apparatus capable of using for a stereoscopic viewing is disclosed, for example, in Japanese Patent Application Laid open No. 281,891/90. In this conventional example, a stereoscopic viewing is performed with a binocular parallax by providing a liquid crystal display (LCD) and a magnifying lens for right and left eyes of a viewer, respectively, and a frame for supporting so as to coincide right and left virtual images generated by the magnifying lens. The image display device, generally, must be constructed so as to coincide parallax or convergence angle with diopter in order not to cause feeling of physical disorder, so that in the conventional example, the convergence angle and the diopter are made coincident with each other in connection with the image displayed in the predetermined conditions.

In the conventional example, however, upon the viewing of the stereoscopic image, the convergence angle is changed by the contents of the image (the magnitude of object to be viewed in the image and the distance from the eyes or the like), the feature that for example, in case of viewing the object at long distance, the convergence angle becomes small and in case of viewing the object at short distance the convergence angle becomes large, is not considered, and the diopter is fixed in spite of the fact that the convergence angle is changed in accordance with the content of the object to be viewed, so that it is impossible to make the convergence angle and the diopter coincident unconditionally, after all, it is impossible to cancel the feeling of physical disorder owing to uncoincidence of parallax or convergence angle and diopter.

As a conventional example in order to resolve this problem is disclosed in Japanese Patent Application Laid open No. 344,541/93. In this conventional example, imaging elements are disposed on a line of sight and left eyes of the image display apparatus, respectively, the image obtained by these imaging elements is displayed by the right and left displaying elements of the image display apparatus, and is adjusted to the appropriate diopter by moving the display lens in the image display apparatus based on the imaging focal distance signal from the auto-focusing section. In this conventional example, the convergence and the diopter are coincident in the predetermined conditions, so that the feeling of physical disorder owing to uncoincidence of convergence angle and diopter in the stereoscopic vision is decreased.

Japanese Patent Application Laid open No. 235,885/94 discloses an image display apparatus in which the line of sight direction of eyes of viewer is detected, the convergence angle is obtained based on the change of the line of sight direction, and the diopter is adjusted based on the convergence angle.

In this example, the display element and the ocular optical system are moved so as to satisfy following equation $$Z = I/\theta$$

wherein

Z is the convergence position (the distance from eyes to the virtual image),

I is the pupil distance (interpupillary distant), and

θ is the convergence angle.

Moreover, Japanese Patent Application Laid open No. 292,093/91 discloses a feature that the point of convergence is detected, the position thereof is compared with the image data to calculate the depth informations, thereby driving ocular lens in accordance with the depth informations.

In Japanese Patent Application Laid open No. 344,541/93, the convergence angle and the diopter are disposed in such a manner that they are coincident only at a point (for example, a center point) of the viewing region (an observation region), so that the convergence angle and the diopter are not coincident for the subject to be viewed present in the other region of the viewing region. Moreover, in case of viewing the image by mounting the image display apparatus, usually the feature of converging only one point continuously is not present always, so that practically, the feeling of physical disorder owing to uncoincidence of convergence angle and diopter in the stereoscopic vision can never be decreased.

In Japanese Patent Application Laid open No. 235,885/94, when the virtual image projected on the position apart from the viewer is a fixed plane, the convergence angle in case of converging the end portion of the virtual image becomes smaller than that in case of converging the center portion of the virtual image. If the image display apparatus in this example converges the end portion of the virtual image, its convergence angle becomes smaller than that in case of converging the center portion of the virtual image, so that the image is lead to a far position than that to be placed originally. Therefore, in case of displaying the object to be viewed at the end portion of virtual image, the problem that the convergence angle and the diopter are not coincident arises.

In Japanese Patent Application Laid open No. 292,093/91, the concrete construction for calculating the depth information is not shown and the method suitable for calculating the depth information is also not disclosed.

SUMMARY OF THE INVENTION

It is an object of the present invention to resolve the above described problems of the conventional image display apparatus.

It is another object of the present invention to provide an image display apparatus capable of obtaining images in which the diopter corresponds to the parallax or convergence angle in whole regions upon viewing the image from the central portion to end portion of the image of the object to be viewed.

According to a first aspect of the present invention, there is provided a head mounted image display apparatus capable of performing a stereoscopical viewing, having first and second image display sections and displaying first and second images each having parallax on these first and second image display sections; characterized by comprising: a position of convergence deciding means for deciding diopter adjusting signals corresponding to parallax or convergence angle of the position of convergence of a viewer by detecting the line of sight direction of at least one eye of the both right and left eyes to decide the position of convergence of the viewer in a viewing region; a diopter adjusting mechanism adapted to receive the diopter adjusting signal for adjusting the diopter of the first and second image display sections; and the position of convergence deciding means including a diopter adjusting signal selecting means for selecting the diopter adjusting signal out of a plurality of diopter adjusting signals or the signals corresponding thereto, based on the position of convergence.

According to the first aspect of the apparatus of the present invention, when the stereoscopic viewing is performed by displaying first and second images having parallax in the first and second image display section corresponding right and left eyes of the viewer, the diopter adjusting signals corresponding to the parallax or convergence angle of the line of sight position are decided only by the fact that the line of sight position of the viewer in the viewing region is decided by detecting the line of sight direction of at least one eye of right and left eyes of the viewer by means of the line of sight position deciding means, and the diopter adjusting mechanism supplied by the diopter adjusting signal adjusts the parallax of the diopter of first and second image display section, so that the image can be viewed with the diopter corresponding to the parallax or convergence angle (depth of image). Therefore, the image having the diopter corresponding to parallax or convergence angle in the whole region of the image viewing from the center to edge portion of the image, so that the feeling of physical disorder is decreased owing to uncoincidence of parallax or convergence angle and the diopter. Therefore, the response speed of the diopter adjustment can be made high speed by selecting diopter adjusting signals from the plural diopter adjusting signals. In this case, previously set plural diopter adjusting signals may be selected, and a plurality of previously set diopter adjusting signals every time outputted in accordance with the selected conditions of the diopter adjusting signal selection means may be selected indirectly. The plural diopter adjusting signals must not be always set previously, and may be changed timely.

In an embodiment of the apparatus according to the present invention, the position of convergence deciding means comprises an image generating means for generating the first and second images based on the object to be viewed to decide the diopter adjusting signal corresponding to the object to be viewed present in the position of convergence after transmitting the position of convergence signals to the image generating means. The diopter adjusting amount to be determined may be obtained for only one point, so that the image display apparatus and its control can be simplified by decreasing the signal transmitting amount in the diopter adjustment.

In a preferable embodiment of the apparatus according to the present invention, the first and second image display sections are LCD, and the diopter adjusting mechanism performs adjustment of the diopter by moving the LCD with respect to the right and left eyes.

It is effective to use LCD as an image display section in order to make the head mounted image display apparatus small in size and light in weight, but the visibility of the LCD becomes worse as visual angle is make slant from its vertical direction, so that in the head mounted image display apparatus, preferable image can be obtained by placing eye at the position that the light ray emitted from the LCD in the vertical direction is gathered or condensed. In order to perform diopter adjustment while always viewing preferable image without changing this relationship, therefore, it is preferable to move the LCD with respect to right and left eyes. Moreover, apparent amount (field) is not changed, so that the apparatus becomes preferable as compared with the case that diopter adjustment is performed by moving optical system.

In a further preferable embodiment of the apparatus according to the present invention, the viewing region is divided into a plurality of regions, and the line of sight direction decides whether the position of convergence converges which region of the plural regions, thereby deciding the diopter adjusting signals corresponding to the decided region.

Since the line of sight position is divided as a region, the diopter adjusting signals may be prepared by only the number of the divided regions. Therefore, recording amount of the diopter adjusting signals can be saved and the operation or arithmetic process for leading it can be omitted as compared with the case of determining the line of sight position as a point, so that the apparatus can be made high in speed and cheap in price.

In a further preferable embodiment of the apparatus according to the present invention, the apparatus further comprises two cameras for generating image signals of the first and second images each having the parallax, and a plurality of a range measuring mechanisms provided in either one of the cameras, the diopter adjusting signals being range signals outputted in accordance with the distance up to the object to be viewed which is to be measured by the plural range measuring mechanisms.

According to this construction, the stereoscopic image having parallax owing to right and left cameras, and the plural range signals in accordance with the distances up to respective viewing subjects in the images obtained under the imaging, can be obtained, so that the diopter can be adjusted by the range signal of the image corresponding to the convergence position of the viewer, and thus the head mounted image display apparatus capable of viewing real image with real time can be attained.

In a further preferable embodiment of the apparatus according to the present invention, the first and second image signals recorded on a record medium, on which first and second image signals corresponding to right and left eyes of the viewer and a plurality of range signals given in accordance with the object to be viewed in the images, are transmitted to the first and second image display sections, and a reproducing device capable of reproducing the plural range signals as the plural diopter adjusting signal is provided.

According to this construction, the stereoscopic image reproduced from the each type of the record medium, on which signals of image having parallax adjusted to the right and left eyes are recorded, can be enjoyed, and the diopter can also be adjusted by the range signal of the image in accordance with the convergence position of the viewer.

In a further preferable embodiment of the apparatus according to the present invention, the plural range signals given in accordance with the first and second image signals and the plurality of range signals given in accordance with the object to be viewed in the images are the signal formed by a computer.

Since a plurality of range signals are transmitted by the signals formed with the computer, these range signals can be lead by the calculating process of the signal formed by the computer in order to set the distance of computer image in accordance with the line of sight position of the viewer, so that the high speed processing of signals and the saving of information amount of the range signals can be performed.

In a further preferable embodiment of the apparatus according to the present invention, the plural diopter adjusting signals or signals corresponding thereto are formed by subjecting the first and second image signals to a correlating operation.

According to this construction, the diopter adjusting signals are generated by performing correlating calculation between images, so that the image in which convergence conditions and the diopter are coincident with each other, can be exhibited even by utilizing the image which is already generated.

According to a second aspect of the apparatus of the present invention, there is provided a head mounted image display apparatus capable of performing a stereoscopical observation and having an image display section for displaying an image having parallax of first and second eyes of a viewer, respectively; characterized by comprising: a diopter adjusting mechanism for adjusting diopter of the image display section in accordance with the inputted diopter adjusting signal; a diopter adjusting signal generating means for generating a plurality of diopter adjusting signals related to the parallax or convergence angle of the image or signals in connection thereto; a position of convergence deciding means for deciding the position of convergence of the viewer in a viewing region by detecting the line of sight direction of at least one eye of the first and second eyes of the viewer; and a diopter adjusting signal selection means for selecting the diopter adjusting signal transmitted to the diopter adjusting mechanism from the plural diopter adjusting signals or the signals corresponding thereto based on the position of convergence.

According to the second aspect of the apparatus of the present invention, when the stereoscopic viewing is performed by displaying first and second images having parallax in the image display section corresponding right and left eyes of the viewer, the diopter adjusting signals corresponding to the parallax or convergence angle of the line of sight position are decided only by the fact that the line of sight position of the viewer in the viewing region is decided by detecting the line of sight direction of at least one eye of right and left eyes of the viewer by means of the line of sight position deciding means, and the diopter adjusting mechanism supplied by the diopter adjusting signal adjusts the parallax of the diopter of image display section, so that the image can be viewed with the diopter corresponding to the parallax or convergence angle (depth of image). Therefore, the image having the diopter corresponding to parallax or convergence angle in the whole region of the image viewing from the center to edge portion of the image, so that the feeling of physical disorder is decreased owing to uncoincidence of parallax or convergence angle and the diopter. Therefore, the response speed of the diopter adjustment can be made high speed by selecting diopter adjusting signals from the plural diopter adjusting signals. In this case, previously set plural diopter adjusting signals may be selected, and a plurality of previously set diopter adjusting signals every time outputted in accordance with the selected conditions of the diopter adjusting signal selection means may be selected indirectly. The plural diopter adjusting signals must not be always set previously, and may be changed timely. Therefore, the response speed of the diopter adjustment can be made higher by selecting the diopter adjusting signals from the plural diopter adjusting signals already set.

In a preferable embodiment of the apparatus according to the present invention, the apparatus further comprises: an image forming device including; the image signal generating means for generating image signals of the image, the diopter adjusting signal generating means, the waveform composer for superimposing the plural diopter adjusting signals or signals in connection thereto on the image signals; and the transmitting means for transmitting the superimposing signals; and a receiving means for receiving the superimposed signals transmitted by the transmitting means, for transmitting the image signals to the image display section and for transmitting the diopter adjusting signals or the signals in connection therewith to the diopter adjusting signal selecting means.

According to this construction, the image signal and the diopter signal are transmitted by subjecting them to a waveform-composing process, so that the signal can be transmitted on only one signal line or only one signal channel. Moreover, the fine image retaining a synchronization of the image signal with the diopter signal can be provided.

In a further preferable embodiment of the apparatus according to the present invention, the apparatus further comprises a recording device for recording the image signals of the image having the parallax, the plural diopter adjusting signals or the signals in connection thereto on a record medium; and a reproducing device for transmitting signals of the image having the parallax and recorded on the record medium, and for reproducing the plural distance of signals as the plural diopter adjusting signals.

According to this construction, the record medium having information, in which a plurality of diopter adjusting signal corresponding to the parallax and the convergence of the image are given on the stereoscopic image, can be formed. If such a record medium is reproduced by the head mounted image display apparatus according to the present invention, the image having adjusted diopter and convergence can be enjoyed.

On viewing such an image, the reproducing device and the head mounted image display apparatus are only prepared, so that the system can be simplified.

In a further preferable embodiment of the apparatus according to the present invention, the plural diopter adjusting signals or the signals in connection thereto are corresponded to coordinates of the image regions of the image, and the diopter adjusting signal selection means decides the corresponding coordinates of the image regions based on the position of convergence decided by the position of convergence deciding means, thereby selecting the diopter adjusting signal based on the coordinates.

According to this construction, the speed of the diopter selection can be more fast only by comparing and selecting the diopter position and the previously set coordinates.

In a further preferable embodiment of the apparatus according to the present invention, the plural diopter adjusting signals in connection with the parallax or convergence angle of the image are formed by subjecting the first and second image signals having parallax of first and second eyes of a viewer to a correlating operation.

According to this construction, the diopter adjusting signal is generated by calculating correlation between images, so that the image in which convergence condition and the diopter are coincident, can be provided even by using the already formed images.

According to a third aspect of the apparatus of the present invention, there is provided a head mounted image display apparatus capable of performing a stereoscopical observation and having an image display section for displaying an image having parallax of first and second eyes of a viewer, respectively; characterized by comprising: a diopter adjusting mechanism for adjusting diopter of the image display section in accordance with the inputted diopter adjusting signal; a plurality of diopter adjusting signal generating means for each generating a plurality of diopter adjusting signals for operating the diopter adjusting mechanism and related to the parallax or convergence angle of the image or signals in connection thereto, in accordance with the viewing subject in the display region of the image; a position of convergence deciding means for deciding the position of convergence of the viewer in a viewing region by detecting the line of sight direction of at least one eye of the first and second eyes of the viewer; and a diopter adjusting signal generating means selection means for selecting the plural diopter adjusting signal generating means for outputting the diopter adjusting signals in accordance with the position of convergence; and the diopter adjusting signals generated by the selected diopter adjusting signal generating means or signals in connection thereto being inputted to the diopter adjusting mechanism as a diopter adjusting signal to be inputted.

According to the third aspect of the apparatus of the present invention, when the stereoscopic viewing is performed by displaying first and second images having parallax in the image display section corresponding right and left eyes of the viewer, the diopter adjusting signals corresponding to the parallax or convergence angle of the line of sight position are decided only by the fact that the line of sight position of the viewer in the viewing region is decided by detecting the line of sight direction of at least one eye of right and left eyes of the viewer by means of the line of sight position deciding means, and the diopter adjusting mechanism supplied by the diopter adjusting signal adjusts the parallax of the diopter of image display section, so that the image can be viewed with the diopter corresponding to the parallax or convergence angle (depth of image). Therefore, the image having the diopter corresponding to parallax or convergence angle in the whole region of the image viewing from the center to edge portion of the image, so that the feeling of physical disorder is decreased owing to uncoincidence of parallax or convergence angle and the diopter. Therefore, the response speed of the diopter adjustment can be made high speed by selecting diopter adjusting signals from the plural diopter adjusting signals. In this case, previously set plural diopter adjusting signals may be selected, and a plurality of previously set diopter adjusting signals every time outputted in accordance with the selected conditions of the diopter adjusting signal selection means may be selected indirectly. The plural diopter adjusting signals must not be always set previously, and may be changed timely. Therefore, the response speed of the diopter adjustment can be made higher by selecting suitable diopter adjusting signal generating means from the plural diopter adjusting signal generating means already set.

In a preferable embodiment of the third aspect of the apparatus according to the present invention, the apparatus further comprises an image forming device including; an image signal generating means for generating image signals of the image, a plural diopter adjusting signal generating means, a position of convergence signal receiving means for receiving the position of convergence signal from the position of convergence decision decision means, a diopter adjusting signal generating means selection means for selecting the diopter adjusting signal generating means by the position of convergence signal receiving means, in accordance with the received position of convergence signal, a waveform composer for superimposing the diopter adjusting signals generated by the diopter adjusting signal generating means selected by the diopter adjusting signal generating means selection means or signals in connection thereto on the image signals, and a receiving means for receiving the superimposed signals transmitted by the transmitting means, for transmitting the image signals to the image display section and for transmitting the diopter adjusting signals or the signals in connection therewith to the diopter adjusting signal selecting means.

According to this construction, this image forming device transmit the image signal and the diopter signal by subjecting them to a waveform-composing process, so that the signal can be transmitted on only one signal line or only one signal channel. Moreover, the signals for fine image retaining a synchronization of the image signal with the diopter signal can be provided.

In a further preferable embodiment of the apparatus according to the present invention, the apparatus further comprises a resolution improving means for improving a resolution of viewing subject in display region of the image corresponding to the convergence position in accordance with the signals representing the convergence position decided by the position of convergence deciding means.

According to this construction, the image having high resolution can be transmitted at line of sight position of the viewer, so that the image can be transmitted effectively.

In a further preferable embodiment of the apparatus according to the present invention, the apparatus further comprises two cameras for generating image signals of first and second images each having parallax, wherein the plural diopter adjusting signal generating means are accommodated in either one of the cameras, and are a plurality of range measuring mechanisms corresponding to the position of convergence, and the diopter adjusting signals are distance or range signals outputted in accordance with the distance up to the viewing substance ranged by the plural range measuring mechanisms.

According to this construction, the stereoscopic image having parallax owing to right and left cameras, and the range signals in accordance with the distances up to respective viewing subjects in the images obtained under the imaging, can be obtained, so that the diopter can be adjusted by the range signal of the image corresponding to the line of sight position of the viewer, and thus the head mounted image display apparatus capable of viewing real image with real time can be attained.

In a further preferable embodiment of the apparatus according to the present invention, the apparatus further comprises two cameras for generating image signals of first and second images each having parallax, wherein the plural diopter adjusting signal generating means are accommodated in either one of the cameras, and are a plurality of range measuring mechanisms corresponding to the position of convergence, the diopter adjusting signals are distance or range signals outputted in accordance with the distance up to the viewing substance ranged by the plural range measuring mechanisms and resolution improving means are focusing mechanisms for focusing the viewing subject in the display region of the image corresponding to the convergence position and arranged in the two cameras.

According to this construction, the image having high resolution and in-focused can be transmitted at line of sight position of the viewer, so that the image can be transmitted effectively.

In a further preferable embodiment of the apparatus according to the present invention, the plural diopter adjusting signal generating means are corresponded to coordinates of the image regions of the image, and the diopter adjusting signal generating means selection means decides the corresponding coordinates of the image regions in accordance with the position of convergence decided by the position of convergence deciding means, thereby selecting the diopter adjusting signal generating means based on the coordinates.

According to this construction, the speed of the selection of the diopter adjusting signal generating means can be more fast only by comparing and selecting the diopter position and the previously set coordinates.

According to a fourth aspect of the apparatus of the present invention, there is provided a head mounted image display apparatus capable of performing a stereoscopical observation and having an image display section for displaying first and second images having parallax of first and second eyes of a viewer, respectively; characterized by comprising: a diopter adjusting mechanism for adjusting diopter of the image display section; a position of convergence deciding means for deciding the position of convergence of the viewer in a viewing region by detecting the line of sight direction of at least one eye of the first and second eyes of the viewer; and a diopter adjusting signal generating means for each generating diopter adjusting signals operating the diopter adjusting mechanism in accordance with the line of sight position determined by the diopter position deciding means and a correlation calculation between the first and the second images.

According to the fourth aspect of the apparatus of the present invention, when the stereoscopic viewing is performed by displaying first and second images having parallax in the image display section corresponding right and left eyes of the viewer, the diopter adjusting signals corresponding to the parallax or convergence angle of the line of sight position are decided only by the fact that the line of sight position of the viewer in the viewing region is decided by detecting the line of sight direction of at least one eye of right and left eyes of the viewer by means of the line of sight position deciding means, and the diopter adjusting mechanism supplied by the diopter adjusting signal adjusts the parallax of the diopter of image display section, so that the image can be viewed with the diopter corresponding to the parallax or convergence angle (depth of image). Therefore, the image having the diopter corresponding to parallax or convergence angle in the whole region of the image viewing from the center to edge portion of the image, so that the feeling of physical disorder is decreased owing to uncoincidence of parallax or convergence angle and the diopter. Therefore, the response speed of the diopter adjustment can be made high speed by selecting diopter adjusting signals from the plural diopter adjusting signals. In this case, previously set plural diopter adjusting signals may be selected, and a plurality of previously set diopter adjusting signals every time outputted in accordance with the selected conditions of the diopter adjusting signal selection means may be selected indirectly. The plural diopter adjusting signals must not be always set previously, and may be changed timely. Therefore, the diopter adjusting signal is generated by calculating correlation between images, so that the image in which convergence condition and the diopter are coincident, can be provided even by using the already formed images.

In a further preferable embodiment of the apparatus according to the present invention, the diopter adjusting signal generating means comprises: a parallax distribution signal generating means for generating a parallax distribution signal in accordance with the first and second images; a transmitting means for transmitting the first image signal and the parallax distribution signal; a distributing means for distributing the parallax distribution signal of the transmitted signals; and a second image signal generating means for generating the second image signal from the one of distributed parallax distribution signal and the first image signal; and a diopter adjusting signal selecting means for deciding the diopter adjusting signal transmitted to the diopter adjusting mechanism in accordance with the convergence position decided by the other of the distributed parallax distribution signals and the convergence position deciding means.

According to this construction, the diopter distribution signal for transmitting the diopter adjusting signal as a part of the image signal is used, so that the transmitting capacity can be made decreased.

According to a fifth aspect of the apparatus of the present invention, there is provided an image forming apparatus comprising: an image signal generating means for generating image signals of the image having parallax corresponding to first and second eyes of a viewer; a diopter adjusting signal generating means for generating a plurality of diopter adjusting signals related to the parallax or convergence angle of the image, or signals in connection thereto; and a waveform composer for superimposing the plural diopter adjusting signals or signals in connection thereto on the image signals; a transmitting means for transmitting the superimposing signals.

According to the fourth aspect of the apparatus of the present invention, this image forming device transmit the image signal and the diopter signal by subjecting them to a waveform-composing process, so that the signal can be transmitted on only one signal line or only one signal channel. Moreover, the signals for fine image retaining a synchronization of the image signal with the diopter signal can be provided.

According to a sixth aspect of the apparatus of the present invention, there is provided an image forming apparatus comprising: an image signal generating means for generating image signals of the image having parallax corresponding to first and second eyes of a viewer; a diopter adjusting signal generating means for generating a plurality of diopter adjusting signals related to the parallax or convergence angle of the image, or signals in connection thereto; and a recording device for recording the image signals, the plural diopter adjusting signals or the signals in connection thereto on a record medium.

According to the fourth aspect of the apparatus of the present invention, the record medium having information, in which a plurality of diopter adjusting signal corresponding to the parallax and the convergence of the image are given on the stereoscopic image, can be formed. If such a record medium is reproduced by the head mounted image display apparatus according to the present invention, the image having adjusted diopter and convergence can be enjoyed.

BRIEF DESCRIPTION OF THE DRAWINGS

FIG. 2 is an explanatory view showing a flow chart by which the function of the first embodiment is explained in principle;

FIG. 3a is an explanatory view showing diopter in case of displaying image of viewing subject at long distance in first embodiment;

FIG. 3b is an explanatory view showing diopter in case of displaying image of viewing subject at short distance in first embodiment;

FIG. 4 is an explanatory view showing image signals used in first embodiment of the present invention;

FIGS. 5a and 5b are explanatory views showing resolution in line of sight position detection by line of sight detection device used in the first embodiment;

FIGS. 17a and 17b are explanatory views showing the construction of a eighth embodiment of a head mounted image display apparatus according to the present invention.

DETAILED EXPLANATION OF THE PREFERRED EMBODIMENT

Figure 1:
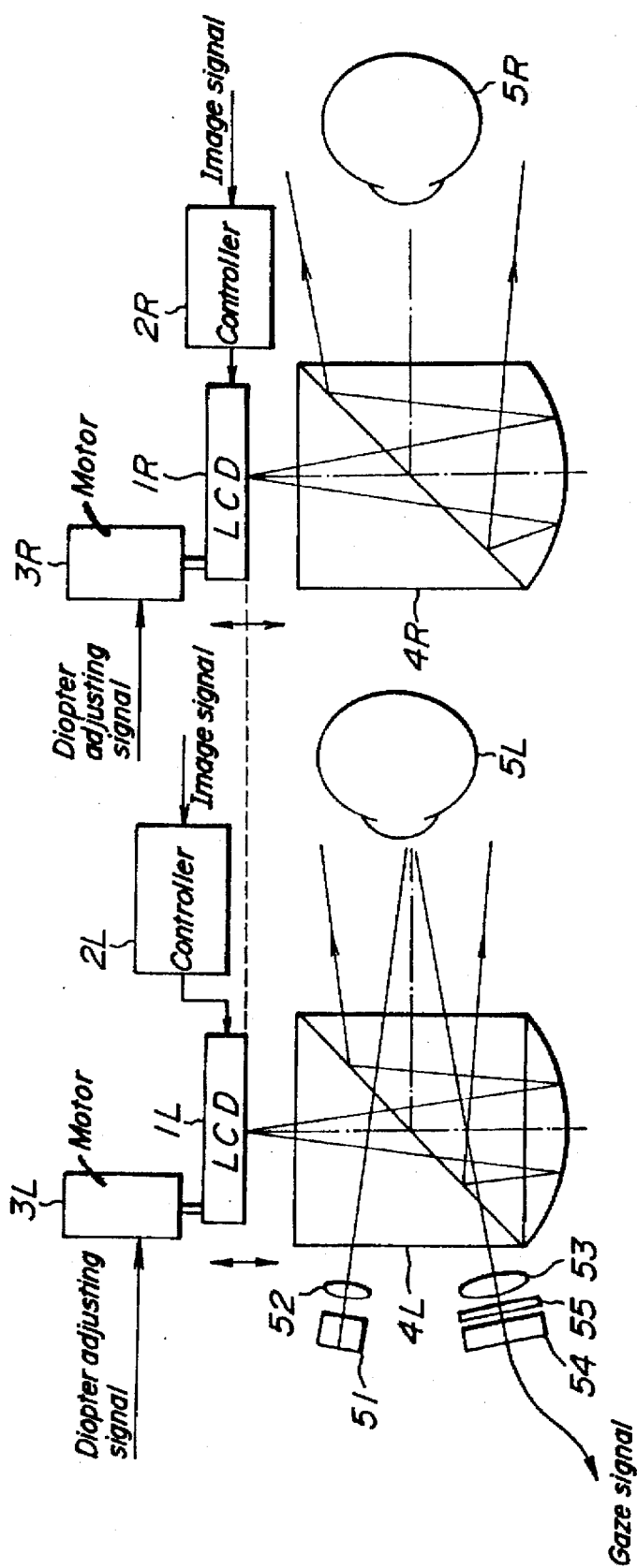
FIG. 1 is an explanatory view showing the construction of a first embodiment of a head mounted image display apparatus according to the present invention.

Now to the drawings, there are shown various embodiments of a head mounted image display apparatus according to the present invention. Like parts are shown by corresponding reference characters throughout several views of the drawings.

FIG. 1 is a system view illustrating a structure of a first embodiment of the head mounted display (HMD) according to the present invention. In FIG. 1, reference numerals 1L and 1R respectively represent an image display member or section, and a LCD is employed as such image display member in the present embodiment. The LCD 1L and 1R are respectively input with a video image as shown in FIG. 4 from respective (stereoscopic display) controllers 2L and 2R, meanwhile their positions are adjusted along the optical axis by motors (diopter adjusting mechanisms) 3L and 3R, in each of which a diopter adjusting signal has been inputted, in order to respectively introduce first and second video images into left and right eyes 5L and 5R of a viewer through ocular optical systems 4L and 4R. With this structure, the first and second video images are respectively projected in the air as a magnified virtual image to each of left and right eyes 5L and 5R of the viewer, and observed as a stereoscopic image due to the binocular parallax.

On the side opposite to the left eye with respect to ocular optical system 4L, there are provided an infrared ray source 51, from which an infrared ray such as LED emitted, and a projecting lens 52. An infrared ray emitted from the infrared ray source 51 impinges on a cornea of the left eye 5L via the projecting lens 52 and a prism member of the ocular optical system 4L. A reflected light from the cornea is again transmitted through the prism member, and received by a CCD 54 via a condenser 53. In this connection, an infrared ray transmissive filter 55, which only allows a transmission of infrared ray, is arranged on the proximal side of the CCD 54 so that a reflected light of the LCD image would not impinge on the CCD 54. Although a line of sight detecting device composed of the above-mentioned elements is only provided in the optical system for left eye in the present embodiment, it can be provided in the optical system for right eye or each of the optical systems for left and right eyes.

According to this line of sight detecting device, a position at which the reflected light of infrared ray is received differs depending upon a deflection angle of the eye. Therefore, the deflection angle of the eye, i.e. the position of convergence within a viewing region, can be detected by obtaining this signal of light-receiving position.

A function of the present embodiment will be explained in principle, referring to a flowchart shown in FIG. 2. First of all, as a process 1 in FIG. 2, a line of sight of an HMD user (viewer) is detected by the above-mentioned line of sight detecting device incorporated within the HMD to determine a region (position) of convergence within the viewing region. Then, as a process 2, there is determined a diopter corresponding to a convergence angle of an objective image, which exists in the convergence region determined in the process 1. In the next process 3, respective diopters of the ocular optical systems 4L and 4R within the HMD are adjusted to agree with the diopter determined in the process 2. By repeating this series of processes, the parallax or convergence angle can agree with the diopter regardless of the position at which the HMD user is gazing in the viewing region, thereby ridding the user of a feeling of physical disorder, which has conventionally been caused by the disagreement between the parallax or convergence angle and the diopter.

Specifically, the diopter is adjusted depending on the relative position of the viewing subject, at which the viewer is gazing, with respect to the positions of the right and left eyes of the viewer. Namely, positions of LCD 1L and 1R are adjusted along the optical axis (in a direction indicated by arrows in FIG. 1) by operating the motors 3L and 3R in accordance with the diopter adjusting signal. When the viewer is gazing a video image of the viewing subject at a short distance as shown in FIG. 3b, the LCD 1L and 1R become more like a concave mirror to increase the convergence angle and diopter (to shift them toward a positive direction), as compared with those at a time when he/she is gazing a video image of the viewing subject at a long distance as shown in FIG. 3a. Therefore, by displaying video images having a different parallax as illustrated in FIG. 4 by means of image signals (the first and second image signals) for the left and right eyes while shifting the LCD 1L and 1R along the optical axis to adjust respective diopters so that they agree with the parallax of viewing subject gazed by the viewer, the convergence angle and the diopter can be agreed with each other as shown in FIGS. 3a and 3b, thereby ridding the viewer of a feeling of physical disorder.

Although the adjustment of the diopter is effected by shifting the positions of the LCD 1L and 1R with respect to the left and right eyes 5L and 5R in this embodiment, the present invention is not restricted thereto and the diopter adjustment can be conducted, for example, by shifting the ocular optical systems 4L and 4R along the optical axis in relation to the left and right eyes 5L and 5R, or by electrically changing a refractive index of the optical member, which is made from a material such as liquid crystal that has a variable refractive index, by means of adjustment of voltage applied thereto.

With respect to a resolution for the detection of line of sight position according to the above-mentioned line of sight detecting process, it can be appropriately adjusted by dividing the entire region into three in horizontal direction to obtain three areas as shown in FIG. 5a, or by dividing it into three in both of vertical and horizontal directions, thereby obtaining nine areas as shown in FIG. 5b. In this case, the convergence angle (parallax) and diopter can be more perfectly agreed with each other, but a procedure for determining the diopter, which will be explained later, becomes more complicated as the resolution is increased.

That is, the plural diopter adjusting signal or the signal related thereto are corresponded to coordinates in the image region, so that diopter adjusting signal selecting means decides the coordinates in the corresponding image region are decided in accordance with the line of sight position decided by the line of sight position deciding means, thereby selecting the diopter adjusting signals based on the decided coordinates.

Figure 6:
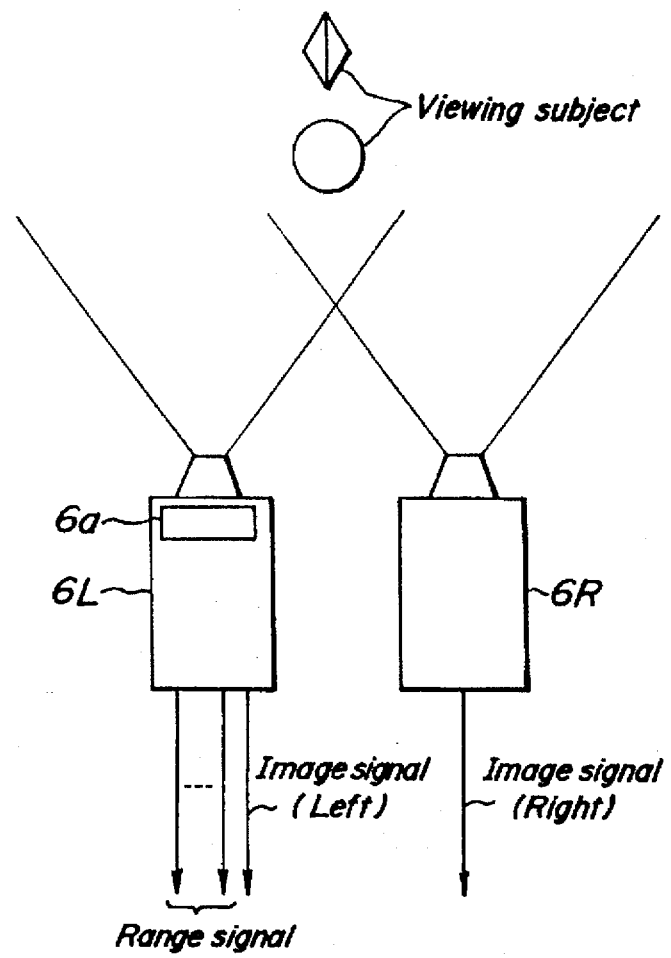
FIG. 6 is an explanatory view showing a system for generating diopter adjusting signal in the first embodiment.
Figure 7:
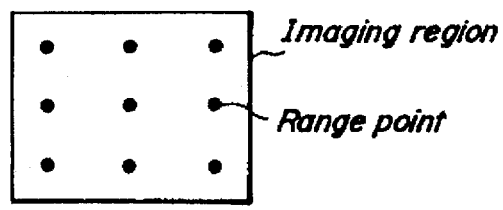
FIG. 7 is an explanatory view showing an arrangement of a range point in imaging region in the first embodiment.

Next, a system for generating the aforementioned diopter adjusting signal will be described with reference to FIG. 6. In FIG. 6, there is illustrated a system wherein a stereoscopic imaging camera is constituted by two cameras 6L and 6R arranged side by side (on left and right). Video images for left and right eyes having a parallax can be obtained by imaging a viewing subject with the two left and right cameras. This stereoscopic imaging camera outputs not only video images for left and right eyes but also range signals, which are obtained by a plurality of range measuring systems 6a provided within one of the left and right cameras (in the left camera in this embodiment) and respectively correspond to distances to a plurality of viewing subjects. For instance, when there are nine range-measuring points in an imaging region as seen in FIG. 7, nine separate range signals are output from the stereoscopic imaging camera.

Figure 8:
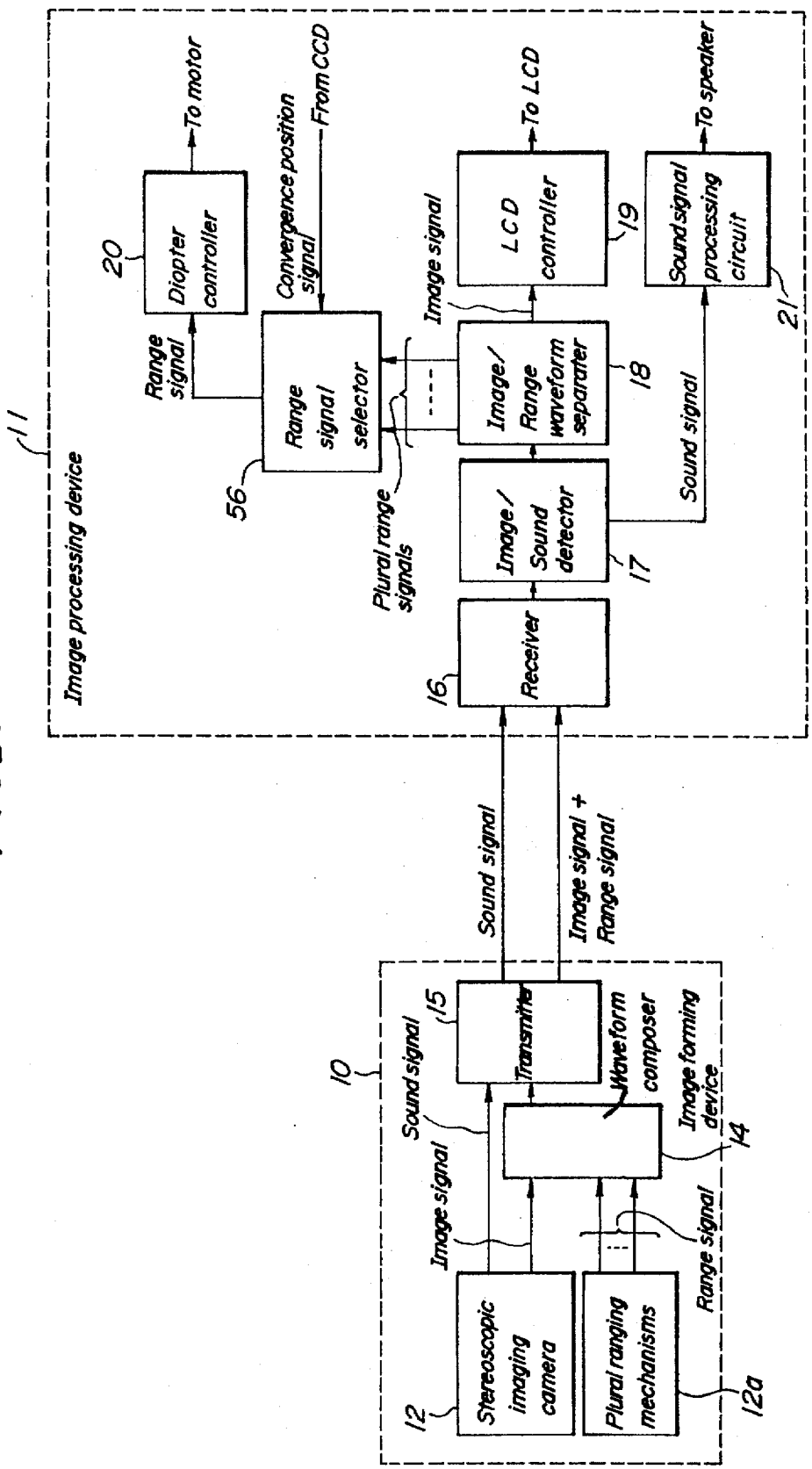
FIG. 8 is an explanatory view showing the construction of a second embodiment of a head mounted image display apparatus according to the present invention.

FIG. 8 is a block view showing a system in which the above-described stereoscopic imaging camera is combined with the head mounted type image display shown in FIG. 1. This system including the head mounted display is comprised of an image forming device 10 and an image processing device 11, and this image forming device 10 includes a stereoscopic imaging camera 12 (which is provided with a plurality of range measuring systems 12a), a waveform composer 14 and a transmitter 15. A plurality of range signals output from the above-mentioned range measuring systems correspond to respective range measuring points in the imaging region, and are superimposed on video images input from the in the stereoscopic imaging camera 12 within the waveform composer 14. In this connection, a method in which a range signal is superimposed on a video image signal during the vertical blanking interval of the video image signal is effective as the signal superimposing method. The resulting video image signal superimposed with the range signal is transmitted to the image processing device 11 along with a sound signal input from the stereoscopic imaging camera 12.

Figure 10:
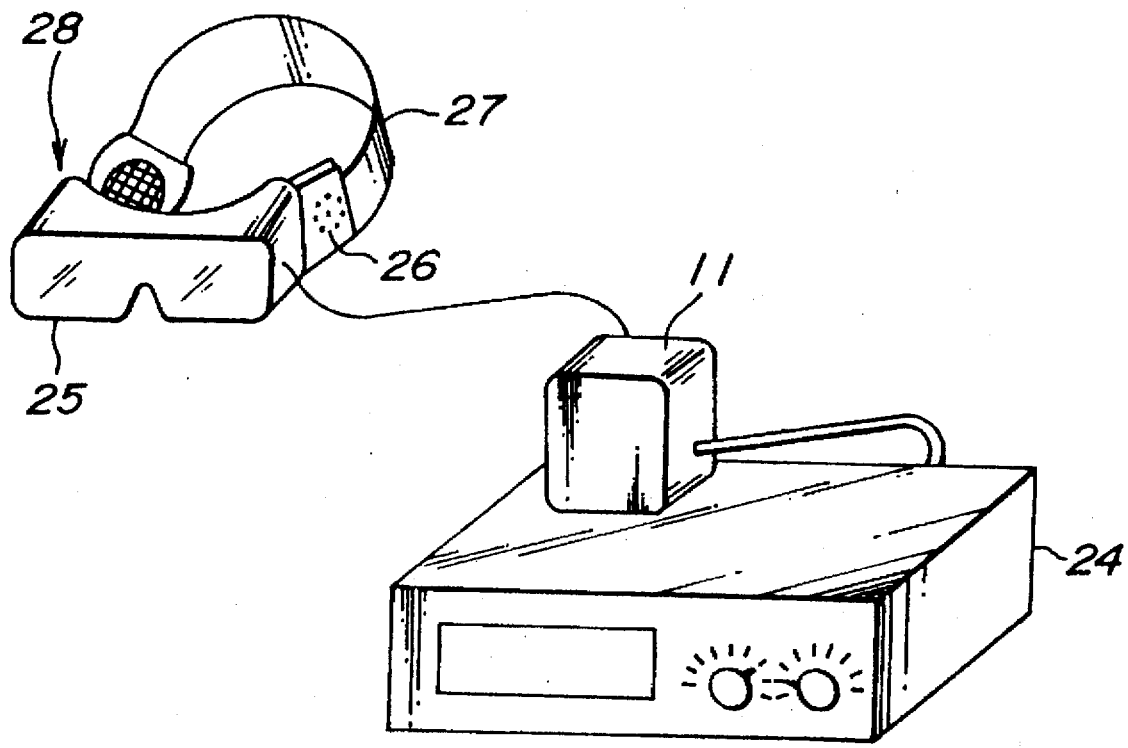
FIG. 10 is a perspective view showing the device disposed at a viewer in the second embodiment.

The image processing device 11 is comprised of a receiver 16, an image/sound detector 17, an image/range waveform separator 18, an LCD controller 19, a diopter controller 20, a range signal selector 56 and a sound signal processing circuit 21. The video image signal with the range signal and the sound signal received by the receiver 16 is supplied into the image/sound detector 17, thereby extracting only the sound signal therefrom to input it into the sound signal processing circuit 21, and then the remaining signal is supplied into the image/range waveform separator 18, thereby extracting the range signal which has been included in the video image signal. Finally, the video image signal is input into the LCD controller 19 to be transmitted to the LCD shown in FIG. 1. The sound signal processing circuit 21 conducts a signal process on the input sound signal, and then transmits the processed sound signal to a loudspeaker (See FIG. 10).

A plurality of range signals extracted in the image/range waveform separator 18 are then input into the range signal selector 56. A range signal of such a range measuring point that corresponds to the line of sight position within the viewing region is selected in this range signal selector 56. For example, when a viewer is gazing one certain point within the LCD display region, a range signal of such range measuring point in an imaging region that corresponds to the above-mentioned gazed point is selected. The thus-selected range signal is transformed into a diopter adjusting signal in the diopter controller 20, and then, for example, input into respective motors 3L and 3R which drive the LCD 1L and 1R as shown in FIG. 1.

Figure 9:
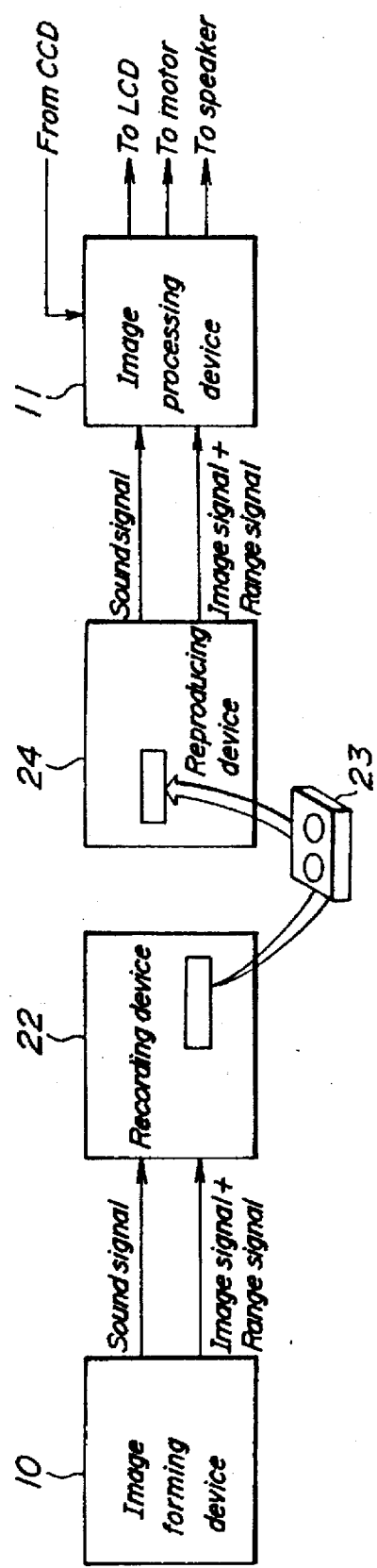
FIG. 9 is an explanatory view showing a construction of the case in which the formed image is once recorded, in the second embodiment.

FIG. 9 is a system view illustrating a structure of a second embodiment of the head mounted display (HMD) according to the present invention. In the second embodiment, the transmitting method for the video image is changed from that of the first embodiment. Namely, a video image formed by the image forming device 10 is directly transmitted to the image processing device 11 in the system for the first embodiment shown in FIG. 8, while in the second embodiment as shown in FIG. 9, a video image including a range signal, video image signal, and sound signal formed by the image forming device 10 is once recorded onto a recording medium 23 (for example, onto a videotape) by means of a recording device 22, and reproduced from the recording medium 23 by a reproducing device 24 when the viewer actually observes the video image. In this case, on the viewer side are only required a reproducing device (video deck) 24, an image processing device 11 and a head mounted display 28 composed of a display device 25, a head phone 26 (with built-in loudspeakers), supporting member 27, etc., thereby resulting in a compact video image display system separated from the image forming device 10.

Figure 11:
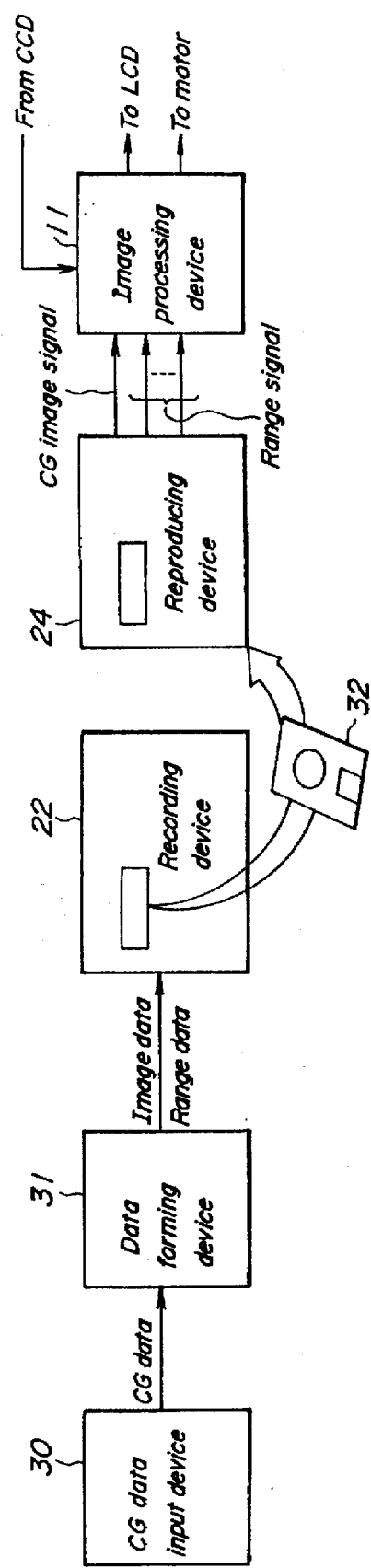
FIG. 11 is an explanatory view showing the construction of a third embodiment of a head mounted image display apparatus according to the present invention.

FIG. 11 is a system view illustrating a structure of a third embodiment of the head mounted display according to the present invention. In the third embodiment, the image forming device 10 of the second embodiment shown in FIG. 9 is replaced by a computer graphics data (CG data) input device 30 and a data forming device 31. Accordingly, in this embodiment, a video image for stereoscopic vision is formed by an image processing with use of CG techniques instead of the image formation from an actual video image obtained through a camera or the like as in the second embodiment.

Referring to FIG. 11, CG data corresponding to a desired CG image are first input into the data forming device 31 from the CG date input device 30. Then, in accordance with these CG data, the date forming device 31 forms left and right image data respectively corresponding to each view seen by left and right eyes having a predetermined interpupillary distance as well as a plurality of range data each representing a depth. These left and right image data and range data are recorded on a recording medium 32 (a magneto-optic disk, a floppy disk or the like) by a recording device 22. Those respective data are reproduced by a reproducing device 24, in which the recording medium 32 has been inserted, to be transformed into CG image data which are then output to the image processing device 11.

Figure 12:
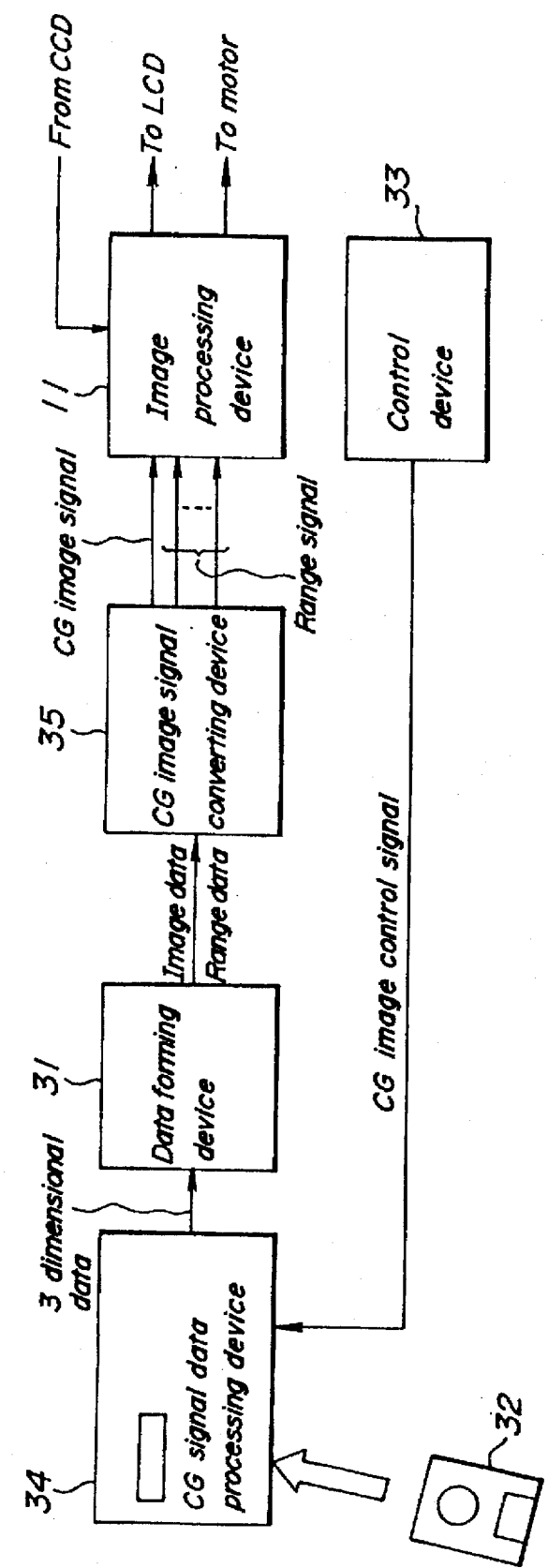
FIG. 12 is an explanatory view showing the construction of the case in which the third embodiment is corresponded to a computer graphics.

This image display system of the third embodiment can be applied to a virtual reality display as follows. Namely, as shown in FIG. 12, a control device 33 (feedback gloves, a mouse, joystick or the like), which is operated by a viewer seeing an image (CG image) displayed on the LCD, is additionally provided in the system and a CG image controlling signal from this control device 33 is input into a CG image data processing device 34. Upon the input of this CG image controlling signal, the CG image data processing device 34 selects desired three-dimensional data corresponding to the CG image controlling signal among those three-dimensional image data read in advance from the recording medium 32, and input them into the data forming device 31. In accordance with these three-dimensional data, the date forming device 31 forms left and right image data and range data, and then inputs them into a CG image signal transforming device 35. The CG image signal transforming device 35 transforms each one of the above-mentioned data into a CG image signal and output them to the image processing device 11.

Figure 13:
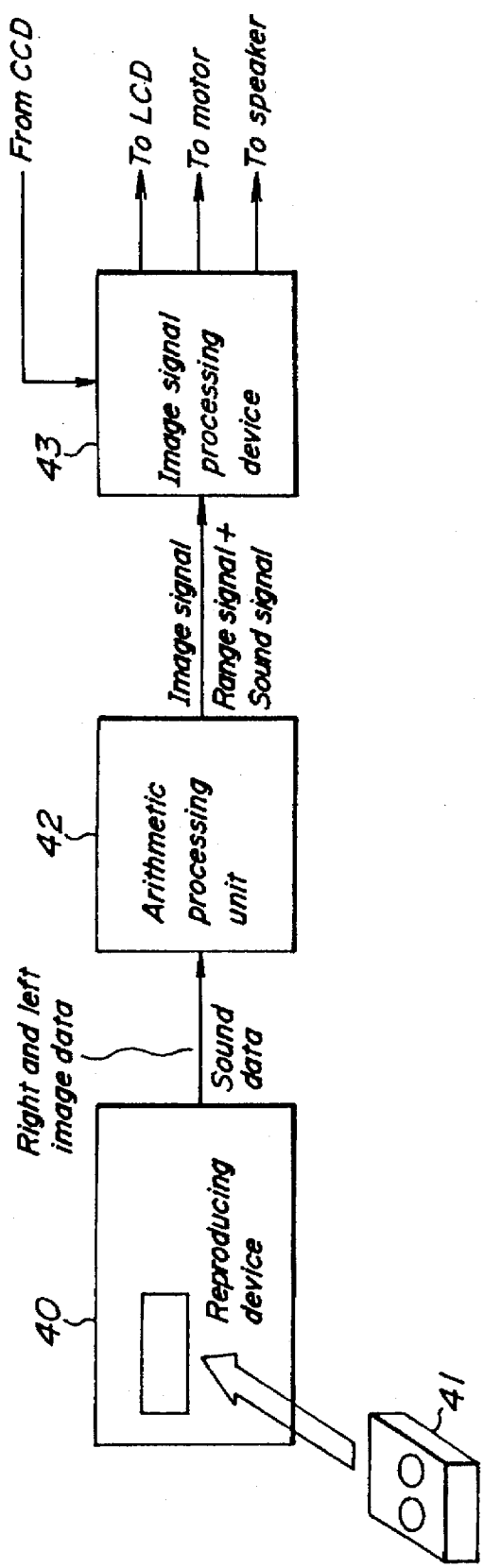
FIG. 13 is an explanatory view showing the construction of a fourth embodiment of a head mounted image display apparatus according to the present invention.
Figure 14:
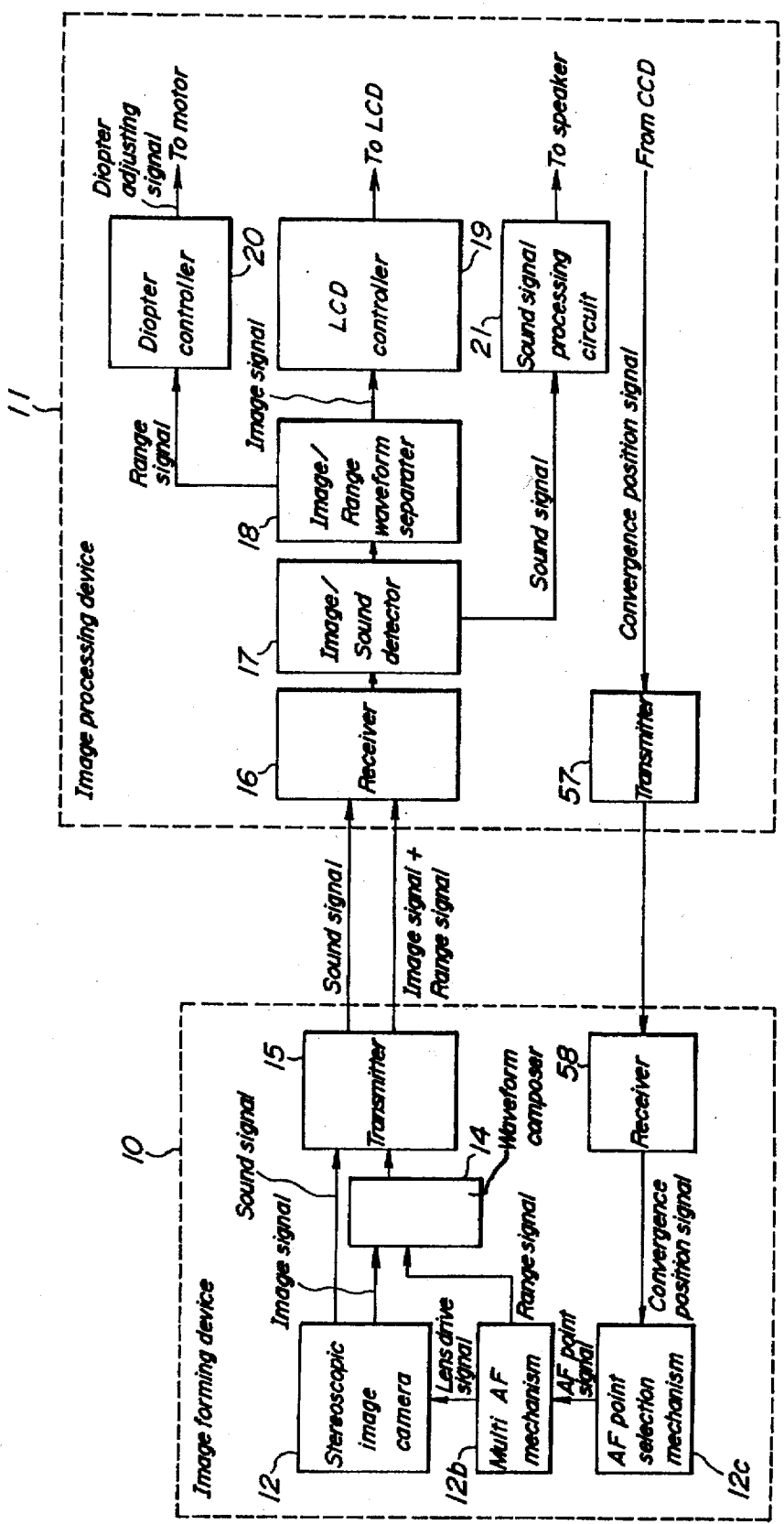
FIG. 14 is an explanatory view showing the construction of a fifth embodiment of a head mounted image display apparatus according to the present invention.

In FIG. 13, there is illustrated a structure of a fourth embodiment of the head mounted display according to the present invention. The fourth embodiment corresponds to the structure of the second embodiment shown in FIG. 9, and the range signals, which are independent of the video image signals in the preceding embodiments, are omitted in this embodiment because they are automatically calculated on the basis of the video image signals.

Referring to FIG. 13, a reproducing device 40 reproduces video images (including sound) for left and right eyes recorded on a recording medium 41 (such as a videotape), and the thus-obtained left and right image data and sound data are input into an arithmetic processing unit 42. This arithmetic processing unit 42 calculates distances to a plurality of viewing subjects by conducting correlational processing of these image data, and the thus-calculated range signals are output to a image signal processing device 43 along with the left and right image signals. Accordingly, it is not necessary to record the range signals on the recording medium 41 in this embodiment. This results in more simple image forming device and recording device.

In FIG. 13, there is shown a structure of a fifth embodiment of the head mounted display according to the present invention. In the preceding embodiments, range data of respective viewing subjects with respect to the viewing region have been prepared in advance, and among them, range data corresponding to line of sight position of a viewer are selected. The diopter is adjusted in accordance with these selected range data. Meanwhile, in the present embodiment, a diopter is measured or calculated only when a convergence region (or line of sight position) is determined within a viewing region, and the diopter is adjusted on the basis of the thus-obtained line of sight position signal.

The head mounted display of the fifth embodiment is obtained by modifying the structure of the first embodiment shown in FIG. 8 in the following manner. As a stereoscopic imaging camera 12 within an image forming device 10, it is used a camera having a multi-automatic focusing (AF) system 12b and automatic focusing (AF) point selecting system 12c instead of a plurality of range measuring systems 12a, which can focus on various points in the viewing region. A transmitter 57 is provided within the image processing device 11 and correspondingly, a receiver 58 is arranged within the image forming device 10. In addition, the range signal selector 56 is omitted from the image processing device 11.

In the fifth embodiment, the line of sight position signal input into the transmitter 57 within the image processing device 11 from the CCD 54 in FIG. 1 is then input the AF point selecting system 12c via the transmitter 57 and the receiver 58 arranged within the image forming device 10. The AF point selecting system 12c selects a point to be focused basing on this line of sight position signal, and inputs an AF point signal into the multi AF system 12b. In accordance with this AF point signal, the multi AF system 12b inputs a lens driving signal into the stereoscopic imaging camera 12. With this signal, the stereoscopic imaging camera 12 focuses on the point selected as described above and outputs a range signal of this very point at the same time. This range signal is transmitted to the image processing device 11 via the waveform composer and the transmitter 15, and the diopter is adjusted in accordance with this range signal.

In the fifth embodiment, not only the diopter and the convergence angle are agreed with each other at the line of sight position of the HMD user (viewer), but also the video image is brought into focus at the line of sight position. Furthermore, different from the preceding embodiments, it is no longer necessary to transmit many (a plurality of) range signals for the adjustment of diopter. Accordingly, the HMD itself as well as its controlling system can be simplified in this embodiment.

Figure 15:
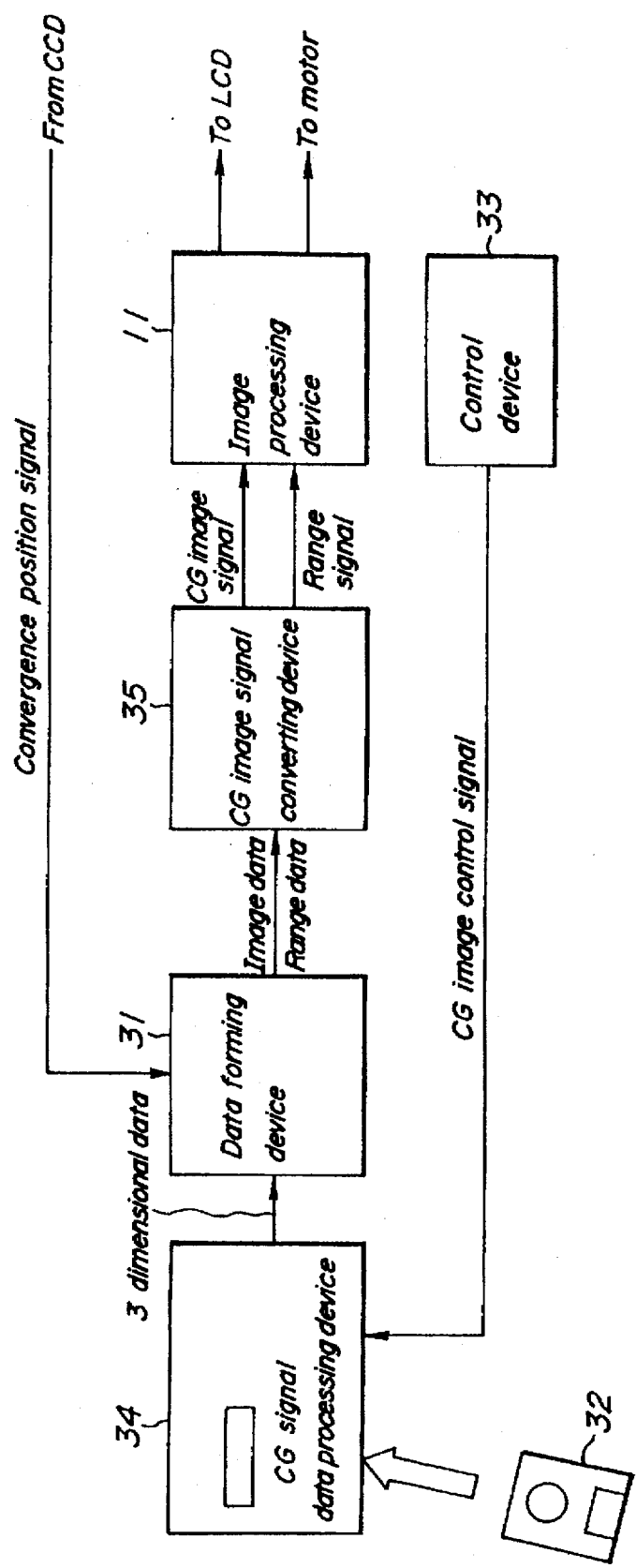
FIG. 15 is an explanatory view showing the construction of a sixth embodiment of a head mounted image display apparatus according to the present invention.

In FIG. 15, there is illustrated a structure of a sixth embodiment of the head mounted display according to the present invention. The head mounted display of the sixth embodiment is obtained by modifying the structure of the third embodiment shown in FIG. 12 so that the line of sight position signal from the CCD 54 is input into a data forming device 31 instead of the image processing device 11.

In the sixth embodiment, the date forming device 31 supplied with the line of sight position signal forms video image data and a range datum of the image of the viewing subject in the convergence region (or at the line of sight position) at the same time. This range datum is input into the motor shown in FIG. 1 via the CG image signal transforming device 35 and the image processing device 11, thereby adjusting diopter in ocular optical system of the HMD. Accordingly, there is no need to form many (a plurality of) range signals for the diopter adjustment and thus, a data processing speed of the data forming device 31 can be heightened in this embodiment.

In the above data forming device 31, it is possible to have the viewer feel that the focus is on the region he/she gazes as in the fifth embodiment by increasing the amount of video image data in the convergence region, thereby heightening the resolution in that area while decreasing the amount in the other region, thereby lowering the resolution therein. As a result, the total amount of the video image data can be reduced in this embodiment.

Figure 16:
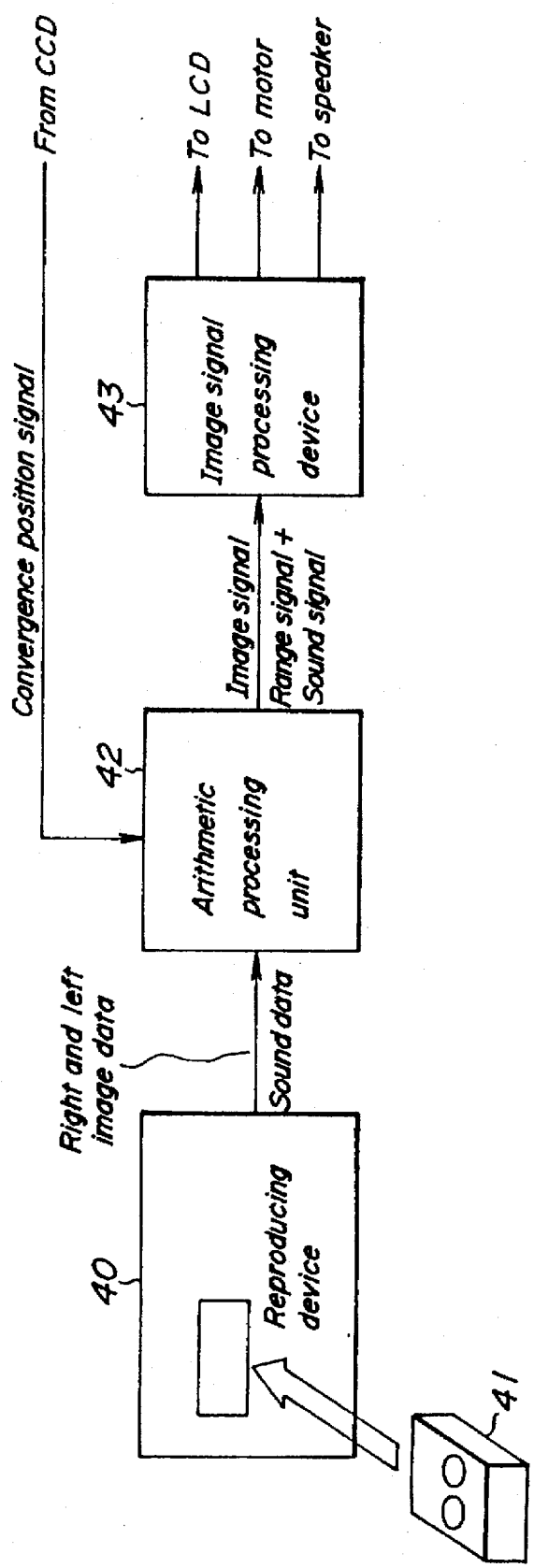
FIG. 16 is an explanatory view showing the construction of a seventh embodiment of a head mounted image display apparatus according to the present invention.

In FIG. 16, there is illustrated a structure of a seventh embodiment of the head mounted display according to the present invention. The head mounted display of the seventh embodiment is obtained by modifying the structure of the fourth embodiment shown in FIG. 13 so that the line of sight position signal from the CCD 54 is input into an arithmetic processing unit 42 instead of the image signal processing device 43.

In the seventh embodiment, the arithmetic processing unit 42 supplied with the line of sight position signal calculates distances to images of the viewing subject by correlating the left and right video images only with respect to the image regions of the viewing subject which exist in the convergence region (at the line of sight position), and the diopter adjustment is conducted basing on the thus-obtained range signal. This results in heightening of the arithmetic processing speed of the arithmetic processing unit 42.

FIGS. 17a and 17b are explanatory views showing an eighth embodiment of a head mounted image display apparatus according to the present invention.

In this embodiment, the apparatus receives and processed either one image of the right and left image signals and the parallax distributing signal instead of two right and left image signals for the construction shown in FIG. 8 of the first embodiment. A part of this parallax distribution signals is selected to obtain a diopter control signal.

The right and left image signals from right and left cameras 12R, 12L are supplied to a parallax distributing signal generating device 71. In this case, the right image is divided into sub-blocks, and every sub-block the sub-block having most high correlation is found from the left image, thereby determining or obtaining the position shift amount thereof, that is, the distribution of the parallax amount.

The image signal and the diopter distribution signal outputted from the diopter distribution signal generating device 71 are subjected to a signal compressing process by signal compressors 72a, 72b.

Such a method of compressing either one of right and left images and parallax distributing signal decreases information amount as compared with the method of compressing both right and left image signals, and thus the transmitting cost can be decreased.

The thus compressed diopter distributing signals and the left image signals are composed by a waveform composer 14 and transmitted by the transmitter 15 together with sound or voice signals.

These signals are received by the receiver 16 and supplied to an image/sound detector 17 to extrude only the sound signals, and then supplied to a sound signal processing circuit 21, thereby subjecting it to a signal process, and finally supplied to the speaker (not shown). While the left image signal and the parallax distributing signal are supplied to an image/parallax distribution waveform separator 73 to extrude the compressed diopter distributing signal and the compressed left image signal. These compressed signals are supplied to signal expanders 74a and 74b to expand these compressed signals.

Then, the parallax distributing signal is distributed to two signals and one of these signals is supplied to a right image generating device 76 together with the left image signal outputted from the signal expander 74b. In the right image generating device 76, right image is reconstructed by the positional shifted amount of the left image signal every sub-block. These right and left image signals are supplied to respective LCDs through LCD controllers 19R and 19L, respectively.

While the other distributed parallax distributing signal is supplied to a signal selector 77. In the signal selector 77, the sub-block is selected in accordance with the convergence position signals from the CCD 54 shown in FIG. 1, thereby reproducing the parallax amount in accordance with the sub-block. This parallax signal is converted into a diopter amount in the parallax controller 20. This diopter amount is supplied to the motor, thereby performing the diopter adjustment.

In this embodiment, the example of reconstructing the right image signal is described, but the left image signal may be reconstructed. As the generation of image, the camera is utilized, but a computer for generating right and left computer graphics or an image reproducing device for reproducing the stereoscopic image which has been already recorded, may also be utilized.

According to this embodiment, the diopter adjustment is performed by using diopter distribution signal which is received as a part of image signal, so that the transmitting cost may be decreased as compared with the first embodiment.

Incidentally, the present invention is not limited to the embodiments explained above, and many modifications and alternations may be conceived without departing from the scope of the invention. For instance, in the first aspect of the invention, a plurality of predetermined diopter adjusting signals or signals associated therewith can be transmitted to the above-mentioned diopter adjusting signal selecting means synchronously with the first and second video images. In this case, the relation between the video images and the diopter adjusting signals is strengthened owing to the synchronization of the video image and the diopter adjusting signals, and thus there never occurs a disagreement between the parallax (convergence angle) and the diopter. Also in the first aspect of the invention, the image forming device can be alternatively designed so that an image of the viewing subject that exists in the convergence region is generated to have a higher resolution than those of the viewing subject that exists in the regions other than the convergence region. In this case, the resolution of the video image is heightened only in the region at which the viewer is gazing and thus, the amount of the video data can be reduced as a whole.

Moreover, the first and second image display sections must not be a plurality of separate image display elements, as shown in the above embodiments, but may be a single image display means having the first and second image display sections.

For example, a first image of the first image display section and a second image of the second image display section are displayed periodically and alternately on a display surface of a single image display means, and means for distributing these first image and second image in correspondence with right and left eyes of the viewer in accordance with the period can also be provided (for example, an optical path is divided into two by a half mirror and two liquid crystal shatters are arranged in these divided optical paths, respectively, to shield the images alternately in accordance with the display period).

What is claimed is:

1. A head mounted image display apparatus capable of performing a stereoscopical viewing, having first and second image display sections and displaying first and second images each having parallax on these first and second image display sections;

characterized by comprising:

a position of convergence deciding means for deciding diopter adjusting signals corresponding to parallax or convergence angle of the position of convergence of a viewer by detecting the line of sight direction of at least one eye of the both right and left eyes to decide the position of convergence of the viewer in a viewing region;

a diopter adjusting mechanism adapted to receive the diopter adjusting signal for adjusting the diopter of the first and second image display sections; and the position of convergence deciding means including a diopter adjusting signal selecting means for selecting the diopter adjusting signal out of a plurality of diopter adjusting signals or the signals corresponding thereto, based on the position of convergence.

2. A head mounted image display apparatus as claimed in claim 1, wherein the position of convergence deciding means comprises an image generating means for generating the first and second images based on the object to be viewed to decide the diopter adjusting signal corresponding to the object to be viewed present at the position of convergence after transmitting the line of sight position signals to the image generating means.

3. A head mounted image display apparatus as claimed in claim 1, wherein the first and second image display sections are LCD, and the diopter adjusting mechanism performs adjustment of the diopter by moving the LCD with respect to the right and left eyes.

4. A head mounted image display apparatus as claimed in claim 1, wherein the viewing region is divided into a plurality of regions, and the line of sight direction decides whether the position of convergence converges which region of the plural regions, thereby deciding the diopter adjusting signals corresponding to the decided region.

5. A head mounted image display apparatus as claimed in claim 1, 2, 3 or 4, further comprising two cameras for generating image signals of the first and second images each having the parallax, and a plurality of a range measuring mechanisms provided in either one of the cameras, the diopter adjusting signals being range signals outputted in accordance with the distance up to the object to be viewed which is to be measured by the plural range measuring mechanisms.

6. A head mounted image display apparatus as claimed in claim 1, 2, 3 or 4, wherein the first and second image signals recorded on a record medium, on which first and second image signals corresponding to right and left eyes of the viewer and a plurality of range signals given in accordance with the object to be viewed in the images, are transmitted to the first and second image display sections, and a reproducing device capable of reproducing the plural range signals as the plural diopter adjusting signal is provided.

7. A head mounted image display apparatus as claimed in claim 6, wherein the plural range signals given in accordance with the first and second image signals and the plurality of range signals given in accordance with the object to be viewed in the images are the signal formed by a computer.

8. A head mounted image display apparatus as claimed in claim 1, 2, 3 or 4, wherein the plural diopter adjusting signals or signals corresponding thereto are formed by subjecting the first and second image signals to a correlating operation.

9. A head mounted image display apparatus capable of performing a stereoscopical observation and having an image display section for displaying an image having parallax of first and second eyes of a viewer, respectively; characterized by comprising:
a diopter adjusting mechanism for adjusting diopter of the image display section in accordance with the inputted diopter adjusting signal;
a diopter adjusting signal generating means for generating a plurality of diopter adjusting signals related to the parallax or convergence angle of the image or signals in connection thereto;
a position of convergence deciding means for deciding the position of convergence of the viewer in a viewing region by detecting the line of sight direction of at least one eye of the first and second eyes of the viewer; and
a diopter adjusting signal selection means for selecting the diopter adjusting signal transmitted to the diopter adjusting mechanism from the plural diopter adjusting signals or the signals corresponding thereto based on the position of convergence.

10. A head mounted image display apparatus as claimed in claim 9, further comprising;
an image forming device including;
the image signal generating means for generating image signals of the image,
the diopter adjusting signal generating means,
the waveform composer for superimposing the plural diopter adjusting signals or signals in connection thereto on the image signals; and
the transmitting means for transmitting the superimposing signals; and
a receiving means for receiving the superimposed signals transmitted by the transmitting means, for transmitting the image signals to the image display section and for transmitting the diopter adjusting signals or the signals in connection therewith to the diopter adjusting signal selecting means.

11. A head mounted image display apparatus as claimed in claim 9, further comprising:
a recording device for recording the image signals of the image having the parallax, the plural diopter adjusting signals or the signals in connection thereto on a record medium; and
a reproducing device for transmitting signals of the image having the parallax and recorded on the record medium, and for reproducing the plural distance of signals as the plural diopter adjusting signals.

12. A head mounted image display apparatus as claimed in claim 9, 10 or 11, wherein the plural diopter adjusting signals or the signals in connection thereto are corresponded to coordinates of the image regions of the image, and the diopter adjusting signal selection means decides the corresponding coordinates of the image regions based on the position of convergence decided by the position of convergence deciding means, thereby selecting the diopter adjusting signal based on the coordinates.

13. A head mounted image display apparatus as claimed in claim 9, wherein the plural diopter adjusting signals in connection with the parallax or convergence angle of the image are formed by subjecting the first and second image signals having parallax of first and second eyes of a viewer to a correlating operation.

14. A head mounted image display apparatus capable of performing a stereoscopical observation and having an image display section for displaying an image having parallax of first and second eyes of a viewer, respectively;
characterized by comprising:
a diopter adjusting mechanism for adjusting diopter of the image display section in accordance with the inputted diopter adjusting signal;
a plurality of diopter adjusting signal generating means for each generating a plurality of diopter adjusting signals for operating the diopter adjusting mechanism and related to the parallax or convergence angle of the image or signals in connection thereto, in accordance with the viewing subject in the display region of the image;
a position of convergence deciding means for deciding the position of convergence of the viewer in a viewing region by detecting the line of sight direction of at least one eye of the first and second eyes of the viewer; and a diopter adjusting signal generating means selection means for selecting the plural diopter adjusting signal generating means for outputting the diopter adjusting signals in accordance with the position of convergence; and the diopter adjusting signals generated by the selected diopter adjusting signal generating means or signals in connection thereto being inputted to the diopter adjusting mechanism as a diopter adjusting signal to be inputted.

15. A head mounted image display apparatus as claimed in claim 14, further comprising:

an image forming device including;

an image signal generating means for generating image signals of the image, a plural diopter adjusting signal generating means, a position of convergence signal receiving means for receiving the line of sight position signal from the position of convergence decision decision means, a diopter adjusting signal generating means selection means for selecting the diopter adjusting signal generating means by the position of convergence signal receiving means, in accordance with the received line of sight position signal, a waveform composer for superimposing the diopter adjusting signals generated by the diopter adjusting signal generating means selected by the diopter adjusting signal generating means selection means or signals in connection thereto on the image signals, and a receiving means for receiving the superimposed signals transmitted by the transmitting means, for transmitting the image signals to the image display section and for transmitting the diopter adjusting signals or the signals in connection therewith to the diopter adjusting signal selecting means.

16. A head mounted image display apparatus as claimed in claim 1 or 13, further comprising:

a resolution improving means for improving a resolution of viewing subject in display region of the image corresponding to the convergence position in accordance with the signals representing the convergence position decided by the position of convergence deciding means.

17. A head mounted image display apparatus as claimed in claim 14 or 15, further comprising two cameras for generating image signals of first and second images each having parallax, wherein the plural diopter adjusting signal generating means are accommodated in either one of the cameras, and are a plurality of range measuring mechanisms corresponding to the position of convergence, and the diopter adjusting signals are distance or range signals outputted in accordance with the distance up to the viewing substance ranged by the plural range measuring mechanisms.

18. A head mounted image display apparatus as claimed in claim 16, further comprising two cameras for generating image signals of first and second images each having parallax, wherein the plural diopter adjusting signal generating means are accommodated in either one of the cameras, and are a plurality of range measuring mechanisms corresponding to the position of convergence, the diopter adjusting signals are distance or range signals outputted in accordance with the distance up to the viewing substance ranged by the plural range measuring mechanisms and resolution improving means are focusing mechanisms for focusing the viewing subject in the display region of the image corresponding to the convergence position and arranged in the two cameras.

19. A head mounted image display apparatus as claimed in claim 14 or 15, wherein the plural diopter adjusting signal generating means are corresponded to coordinates of the image regions of the image, and the diopter adjusting signal generating means selection means decides the corresponding coordinates of the image regions in accordance with the position of convergence decided by the position of the convergence deciding means, thereby selecting the diopter adjusting signal generating means based on the coordinates.

20. A head mounted image display apparatus capable of performing a stereoscopical observation and having an image display section for displaying first and second images having parallax of first and second eyes of a viewer, respectively;

characterized by comprising:

a diopter adjusting mechanism for adjusting diopter of the image display section;

a position of convergence deciding means for deciding the position of convergence of the viewer in a viewing region by detecting the line of sight direction of at least one eye of the first and second eyes of the viewer; and a diopter adjusting signal generating means for each generating diopter adjusting signals operating the diopter adjusting mechanism in accordance with the line of sight position determined by the diopter position deciding means and a correlation calculation between the first and the second images.

21. A head mounted image display apparatus as claimed in claim 20, wherein the diopter adjusting signal generating means comprises:

a parallax distribution signal generating means for generating a parallax distribution signal in accordance with the first and second images;

a transmitting means for transmitting the first image signal and the parallax distribution signal;

a distributing means for distributing the parallax distribution signal of the transmitted signals; and a second image signal generating means for generating the second image signal from the one of distributed parallax distribution signal and the first image signal; and a diopter adjusting signal selecting means for deciding the diopter adjusting signal transmitted to the diopter adjusting mechanism in accordance with the convergence position decided by the other of the distributed parallax distribution signals and the convergence position deciding means.

22. An image forming apparatus comprising:

an image signal generating means for generating image signals of the image having parallax corresponding to first and second eyes of a viewer;

a diopter adjusting signal generating means for generating a plurality of diopter adjusting signals related to the parallax or convergence angle of the image, or signals in connection thereto; and a waveform composer for superimposing the plural diopter adjusting signals or signals in connection thereto on the image signals;

a transmitting means for transmitting the superimposing signals.

23. An image forming apparatus comprising:

an image signal generating means for generating image signals of the image having parallax corresponding to first and second eyes of a viewer;

a diopter adjusting signal generating means for generating a plurality of diopter adjusting signals related to the parallax or convergence angle of the image, or signals in connection thereto; and a recording device for recording the image signals, the plural diopter adjusting signals or the signals in connection thereto on a record medium.

24. A head mounted image display apparatus as claimed in claim 16, further comprising two cameras for generating image signals of first and second images each having parallax, wherein the plural diopter adjusting signal generating means are accommodated in either one of the cameras, and are a plurality of range measuring mechanisms corresponding to the position of convergence, and the diopter adjusting signals are distance or range signals outputted in accordance with the distance up to the viewing substance ranged by the plural range measuring mechanisms.

25. A head mounted image display apparatus as claimed in claim 16, wherein the plural diopter adjusting signal generating means are corresponded to coordinates of the image regions of the image, and the diopter adjusting signal generating means selection means decides the corresponding coordinates of the image regions in accordance with the position of convergence decided by the position of the convergence deciding means, thereby selecting the diopter adjusting signal generating means based on the coordinates.

* * * * *